United States Patent

Sabaroff

[15] 3,644,886

[45] Feb. 22, 1972

[54] MONITORING SYSTEM FOR VEHICLE LIGHTING CIRCUITS

[72] Inventor: Samuel Sabaroff, 5921 McDonie Avenue, Woodland Hills, Calif. 91364

[22] Filed: Dec. 17, 1969

[21] Appl. No.: 885,842

[52] U.S. Cl..............................340/80, 340/251, 335/154, 315/82
[51] Int. Cl......................................................G08b 21/00
[58] Field of Search................340/52, 79, 80, 248, 251, 252, 340/253; 335/151, 152, 154; 315/77, 82, 129, 130

[56] References Cited

UNITED STATES PATENTS 3,312,967 4/1967 Levine..................................340/253

*Primary Examiner*—Alvin H. Waring
*Attorney*—Fraser & Bogucki

[57] ABSTRACT

A failsafe, low-power-monitoring system for vehicle lighting circuits is disclosed which utilizes a characteristic high initial current transient surge to close a sensitive reed relay switch coupled to energize an instrument panel light which indicates when current is flowing through all of the lamp filaments of the lighting circuit being monitored. The energizing coil of the reed relay switch is provided with a predetermined number of turns so that the dropout current is a predetermined amount less than the steady state current of the lighting circuit with all lamps functioning, the failure of one or more of the lamps reducing the current flow to a level below dropout.

8 Claims, 4 Drawing Figures

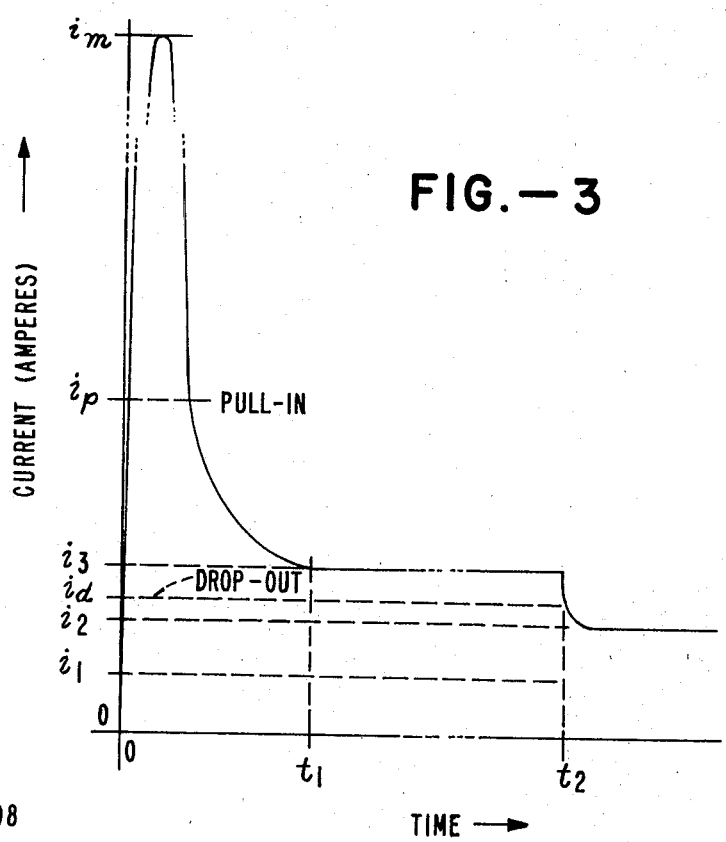
FIG.—3
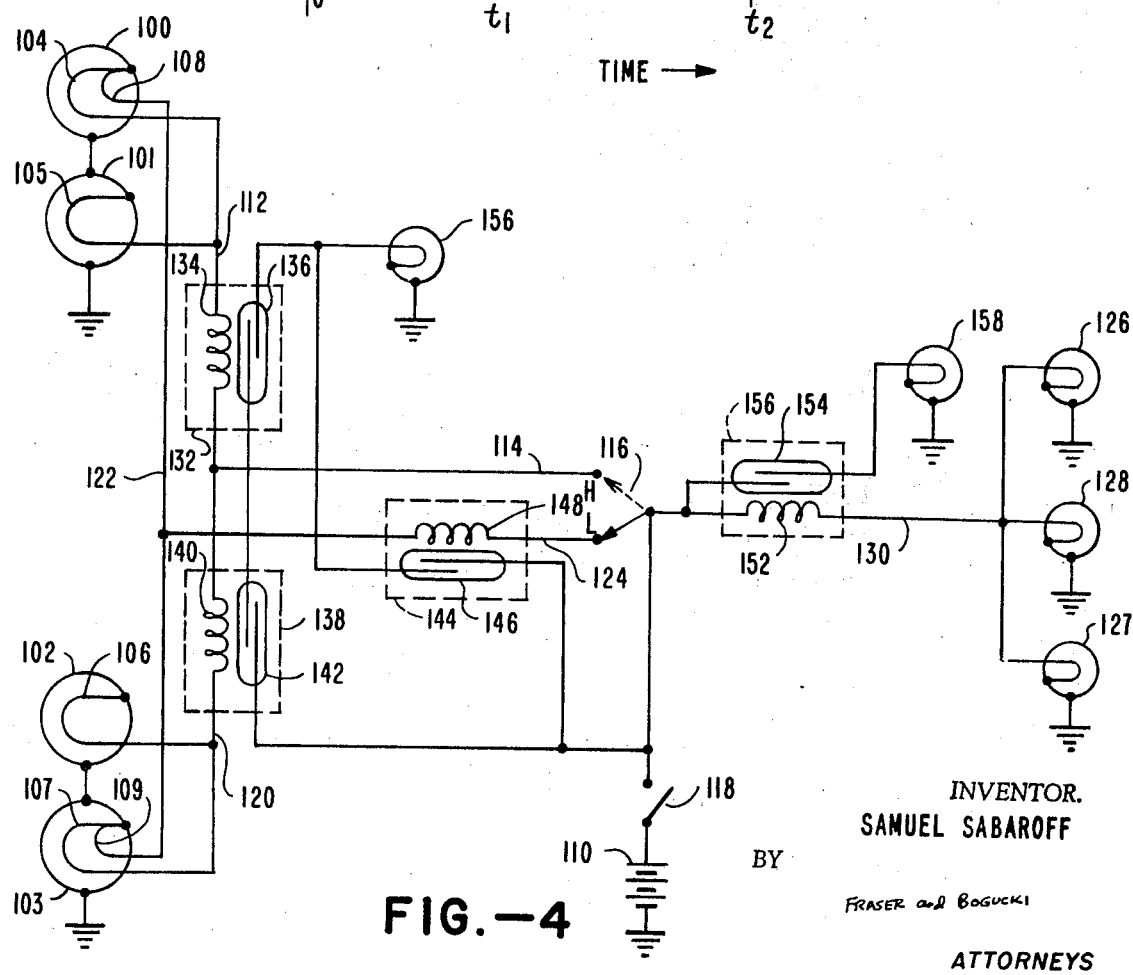
FIG.—4
INVENTOR.
SAMUEL SABAROFF
BY
FRASER and BOGUCKI
ATTORNEYS

MONITORING SYSTEM FOR VEHICLE LIGHTING CIRCUITS

BACKGROUND OF THE INVENTION

1. Field of the Invention

This invention relates generally to apparatus for monitoring vehicle lighting circuits and particularly to monitoring apparatus of this type including a reed relay-switching means which consumes very little electrical power and is sensitive to the failure of one of a plurality of lamps connected in the lighting circuits.

2. Description of the Prior Art

It is often inconvenient and virtually impossible when a vehicle, such as an automobile, is in motion for the operator to determine whether the taillights are working properly. Checking the condition of these lights usually entails getting into the automobile, turning the lights on, getting out and going around behind the automobile. Since most drivers do not bother to go through such a procedure at regular intervals, they may drive for some time with a burned-out taillight and not realize it.

Another problem may occur if a headlight burns out while driving on a busy or well-lighted street. Because of all the other lights which are present, the driver might unknowingly drive for an extended period with a burned-out headlight thus creating a danger to both himself and others. Typically, the fact that a headlight has burned out is not discovered until the driver turns onto a darkened street where the burned-out headlight creates even more of a hazard.

The prior art discloses monitoring systems employing relay devices having high-resistance energizing coils with many turns in series with the lamps to be monitored. These relays include the well-known contact arrangement in which a movable contact is mounted on a pivotally supported armature which in turn is biased, typically by means of a coil spring, to the open position. The magnetic flux levels required for both closing the contacts ("pull in") and holding the contacts closed are substantial and relatively large amounts of power are therefore consumed for these operations consequently reducing the power available to operate the lighting circuit being monitored.

Also, most of the prior art monitoring systems are relatively insensitive and cannot detect the failure, for example, of one out of three lamps in the same circuit. Furthermore, the life of these relays is relatively short and their characteristics change during their lifetime because, among other things, the spring rate of the biasing spring deteriorates with time. For the foregoing reasons and because of other drawbacks, such as cost and bulk, the prior art devices have never found acceptance and as far as is known none of the prior art monitoring systems presently enjoys commercial usage of any significance.

SUMMARY OF THE INVENTION

The present invention utilizes a sensitive reed relay switch connected in the vehicle lighting circuit to be monitored. The characteristics of the reed relay switch are determined by and made compatible with the starting transient and steady state characteristics of the circuit being monitored.

The indicator circuit of the present invention makes use of the initial high-current surge in the lighting circuit to supply the power needed to close the reed relay switch. In contradistinction with the high-inertia-switching devices of the prior art, reed relay switches according to the present invention have switching speeds and response times which make it possible to utilize the short duration starting transient of the lighting circuit to close the contacts. Once the reed relay switch is closed, very little power is taken from the system being monitored to maintain the switch in its closed position. The resistance of the reed relay switch-energizing coil is very low so that the light intensity of the lamps being monitored is barely affected.

The invention is particularly useful for monitoring a plurality of lamps connected in the same lighting circuit. The reed relay switch characteristics are predetermined so that with all lamps of the circuit functioning normally, a sufficient amount of magnetic flux is generated to maintain the reed relay switch contacts closed. Yet if any one of the lamps in the lighting circuit fails, the resulting decrease in current, which decrease may be of relatively small magnitude, is well below the dropout level of the reed relay switch so that a positive, reliable indication of lamp failure is provided.

Because of the normally open operation of the reed relay switch, the burnout indicator light mounted, for example, on the instrument panel of the vehicle, remains lit when all of the lamps of the lighting circuit are functioning normally. This provides a failsafe type of indication since the failure of the signal light would not falsely indicate that all of the lamps being monitored are functioning normally.

Further in accordance with the invention, one or more reed relay switches fabricated pursuant to the teachings of the invention, may be combined in various ways with one or more indicator lights on the vehicle instrument panel. By way of specific example, the high beam headlight circuit of an automobile may be monitored by a first reed relay switch, the low beam circuit by a second reed relay switch and the circuit supplying the taillights and license plate light by a third reed relay switch. Since the high beam and low beam circuits operate on a mutually exclusive basis, the contact pairs of the reed relay switches monitoring these circuits may be separately connected in series with the contact pair of the third reed relay switch to operate a single burnout indicator light. Alternatively, the headlight circuit reed relay switches may be used to energize a first indicator light and the taillight and license plate light reed relay switch may be used to energize a second indicator light. It will thus be evident that a great variety of switch/indicator light arrangements are made possible.

BRIEF DESCRIPTION OF THE DRAWINGS

Further objects and advantages of the present invention will become apparent from a reading of the detailed description below which makes reference to the accompanying drawings, in which:

FIG 3 is a graphical representation of the current-time characteristic of certain of the lamps of the lighting circuit of FIG. 1; and FIG. 4 is a schematic circuit diagram of another typical automobile lighting circuit utilizing a monitoring system in accordance with an alternative embodiment of the present invention.

DETAILED DESCRIPTION

Figure 1:
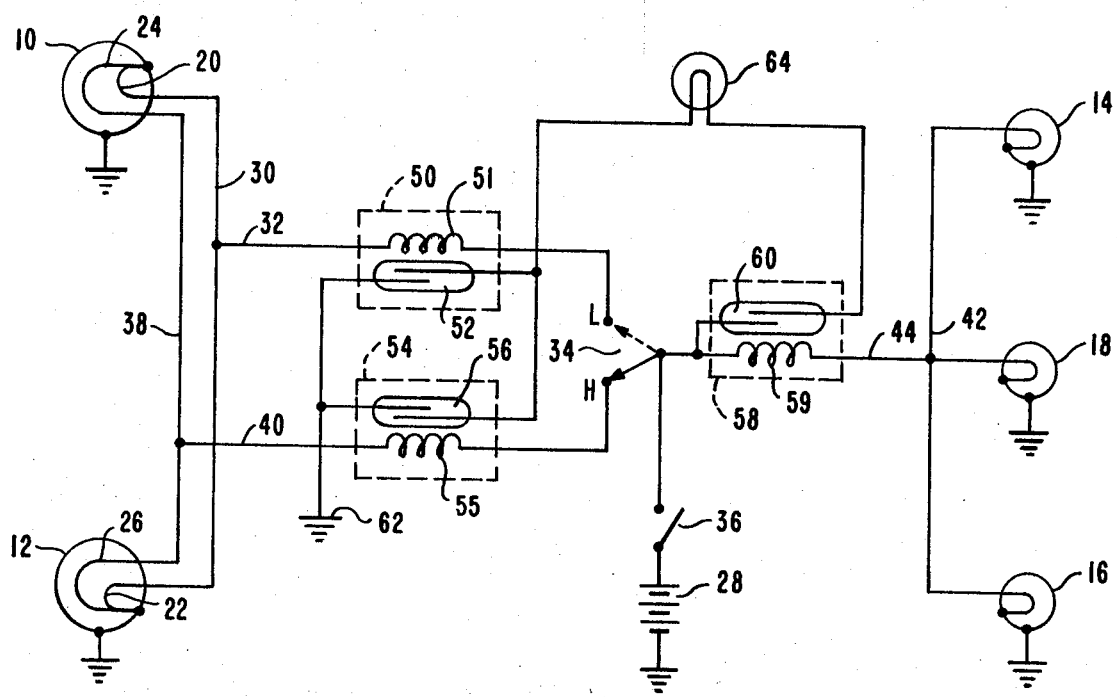
FIG. 1 is a schematic circuit diagram of a typical automobile lighting circuit with a monitoring system in accordance with the present invention.

FIG. 1 is a somewhat simplified schematic of a typical automobile lighting circuit employing a monitoring system according to the present invention. The circuit is exemplary of those currently in use and includes headlights 10 and 12, taillights 14 and 16 and rear license plate light 18.

The headlights 10 and 12 include low beam filaments 20 and 22, respectively, and high beam filaments 24 and 26, respectively. The low beam filaments 20 and 22 are connected to the automobile power supply 28 by conductors 30 and 32, beam selector switch 34 and the main lighting circuit switch 36. Similarly, the high beam filaments 24 and 26 are connected to the supply 28 by conductors 38 and 40 and the switches 34 and 36.

The filaments of taillights 14 and 16 and the filament of the license plate light 18 are connected in parallel and coupled to the supply 28 by conductors 42 and 44 and the lighting circuit switch 36.

In the embodiment depicted in FIG. 1, a lighting circuit-monitoring system pursuant to the present invention and including three reed relay switches 50, 54 and 58 is utilized. The low beam headlight reed relay switch 50 includes an energizing coil 51 connected in the conductor 32 and in series with the parallel combination of the low beam filaments 20 and 22, and a pair of reed contacts 52 adapted to be closed upon energization of the coil 51 as the result of current of some minimum level flowing in the low beam filament circuit. In similar fashion, the reed relay switch 54 monitors the high beam headlight circuit and includes an energizing coil 55 in the conductor 40 and a contact pair 56. Lastly, the portion of the circuit supplying the parallel combination of taillights 14 and 16 and license plate light 18 is monitored by reed relay switch 58 consisting of an energizing coil 59 in conductor 44 and a pair of contacts 60.

The contact pairs 52 and 56 of the switches 50 and 54, respectively, are connected in parallel. One end of this parallel circuit is grounded at 62 and the other end is coupled to the supply 28 via the series combination of an instrument panel warning lamp 64, the contact pair 60 of switch 58 and the main lighting switch 36.

The manner and characteristics of the operation of the monitoring circuit will be described in greater detail below; however, it may be stated by way of brief summary that with the main switch 36 closed, so long as all of the lighting circuit filaments are functioning, the contacts 60 in combination with one or the other contact pairs 52 and 56 (depending upon whether the low beam or high beam filaments are energized) will remain closed and warning lamp 64 lit. Should any of the various filaments in the lighting circuit fail, the current level in the portion of the lighting circuit affected will drop and the contacts of the corresponding reed relay switch will open thereby turning off lamp 64 thus warning the driver that one of the lights has burned out. It will be appreciated that this provides a failsafe mode of operation because even if the instrument panel warning light 64 failed it would not erroneously indicate that all lights were functioning normally. In any event, the instrument panel light 64 is selected for exceedingly long life.

Figure 2:
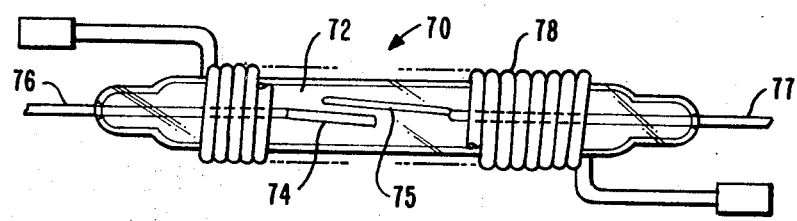
FIG. 2 is a longitudinal cross-sectional view of a reed relay switch incorporating certain other aspects of the invention.

Turning now to FIG. 2, there is shown a typical reed relay switch 70 for use in a monitoring system of the present invention. The switch is of the normally open type and includes an elongated, glass housing 72 hermetically enclosing a pair of magnetic reeds 74 and 75 having leads 76 and 77, respectively, for connection to the warning lamp circuitry. Wound around the housing 72 is a magnetizing coil 78 of relatively heavy wire and adapted to be connected in series in the lighting circuit to be monitored. The number of turns of this coil is of importance in connection with the proper operation of the present invention and the determination thereof will be described in detail below. The entire reed relay assembly may be encapsulated in an appropriate epoxy, heat-shrinkable tubing, or other protective material (not shown). Switches of this type have a number of desirable characteristics including long life, rapid response and low holding current requirements. The pull-in or closing current may be of the order of three times the holding current for a given number of turns of the energizing coil and, as will be pointed out, this characteristic is also used to advantage. More specifically, it has been found that 60 ampere-turns for pull-in and 20 ampere-turns for dropout provides satisfactory switch operation.

For purposes of describing the operation of the invention and the determination of the reed relay switch characteristics, reference will be made to the graphical representation of FIG. 3 and, by way of example, to the taillight/license plate light portion of the circuit of FIG. 1 monitored by reed relay switch 58.

Being of the incandescent lamp type, lights 14, 16 and 18 in combination will exhibit a current-time characteristic such as that roughly shown in FIG. 3. The current is that flowing in the conductor 44. The low cold resistance of the filaments of the lights 14, 16 and 18 results in a marked surge of current when the switch 36 is closed. The current surge peaks out at some maximum value designated $i_m$ in FIG. 3 and which typically may be of the order of 10 or more times that of the steady state current $i_3$ for the combination of the three lights 14, 16 and 18. (The steady state current level for any two of the three lights is designated $i_2$ and for any one light $i_1$.) As the filaments heat and their resistances therefore increase, the current decreases to its steady state level $i_3$ which is reached at some time $t_1$. The value of $t_1$ is typically only a small fraction of a second, too short a time duration for the relay devices of the prior art to respond.

It has been found that for reliable dropout of the reed relay switch, the current should drop to 75 percent of the steady state current level of the circuit when all lights are functioning. This dropout level is indicated in FIG. 3 by the line $i_d$. The pull-in current level, $i_p$, is then only reached during the initial surge period. The number of turns of the energizing coil of the reed relay switch is based on the dropout value.

By way of example, based upon actual measurements on commercially available automotive lamps, the current drawn by each of the lights 14, 16 and 18 is about 0.54 amps for a total, $i_3$, of 1.62 amps when all three are lit. The dropout current for this case is 0.75 (1.62) or 1.22 amperes. As indicated above, the nominal ampere-turns for dropout is 20 ampere-turns and therefore, the number of turns is 20/1.22 or about 16 turns. $i_m$ for the three lamps in question is approximately 15 amperes so that the startup ampere-turns of 15 (16) or 240 ampere-turns is well above the 60 ampere-turns required for pull-in. Should one of the lamps burn out, as shown, for example, taking place at $t_2$ in FIG. 3, the current level immediately drops to $i_2$ well below the dropout level of the reed relay switch thereby causing the contacts 60 to open to turn off the warning light 64.

Turning now to FIG. 4, there is shown an alternative embodiment of a monitoring system according to the present invention utilizing separate instrument panel warning lights for the headlights and the taillight/license plate light combination. The lighting circuit includes four headlights 100, 101, 102 and 103 housing high beam filaments 104, 105, 106 and 107, respectively. Low beam filaments 108 and 109 are included in the outer headlights 100 and 103, respectively. The parallel-connected high beam filaments 104 and 105 are coupled to the automobile power supply 110 by conductors 112 and 114, the high/low beam selector switch 116 and the main lighting system switch 118. Likewise, the high beam filaments 106 and 107 on the other side are connected to the power supply 110 by the conductors 120 and 114, and the switches 116 and 118. The parallel low beam filaments 108 and 109 are coupled to the switch 116 by conductors 122 and 124.

The rear light configuration is the same as that described in connection with FIG. 1, including a pair of taillights 126 and 127 and a central license plate light 128. These lights are connected to the power supply 110 by a conductor 130 and the main switch 118. A first reed relay switch 132 having an energizing coil 134 in the line 112 and contacts 136, monitors the high beam filaments 104 and 105. Similarly, a second reed relay switch 138 having its energizing coil 140 in the line 120 and contacts 142 monitors the high beam filaments 106 and 107 on the other side. A third reed relay switch 144 with contacts 146 and whose energizing coil 148 is connected in the line 124, monitors the condition of the low beam filaments 108 and 109. The rear lights 126-128 are monitored by a fourth reed relay switch 150 having an energizing coil 152 in the line 130 and a pair of contacts 154.

The contacts 136 and 142 of the high beam switches 132 and 138 and a headlight warning lamp 156 mounted on the instrument panel are connected in series between the supply 110 and ground. The contacts 146 of the low beam switch 144 are connected across the series combination of the switches 132 and 138. During operation of the high beam filaments, the warning lamp 156 is energized through the contacts 136 and 142 and should any of the four filaments 104-107 fail, one or the other of the switches will drop out thereby turning off the warning light 156. During low beam operation, the warning lamp 156 is energized solely through the low beam switch contacts 146.

The contacts 154 of the rear light monitoring switch 150 are connected between the power supply and a second warning lamp 158 which thereby monitors the condition of the filaments of the lamps 126–128.

While there have been shown and described various embodiments of the invention, it will be understood that the invention may be embodied otherwise than as herein specifically illustrated and described, and that certain changes in the form and arrangement of parts and in the specific manner of practicing the invention may be made without departing from the underlying ideas or principles of the invention as set forth by the appended claims. Furthermore, it will be obvious that the invention has a broad range of utility, being applicable not only to the lighting circuits of any type of vehicle—land, airborne or otherwise—but also to any electrical system in which is it desired to monitor the condition of remotely located lamps.

What is claimed is:

1. A failsafe system for monitoring the lighting circuit of a vehicle, said circuit including incandescent lamp means having a relatively low heat resistance, the current in said circuit surging momentarily to a high level during startup of said lamp means and having a substantially lower, steady state level during normal operation of said lamp means, said system including reed relay switch means having predetermined dropout and pull-in ampere-turn characteristics, said switch means comprising an energizing coil adapted to be connected in said lighting circuit in series with said lamp means and magnetizable contact means movable to the closed position upon energization of said coil, said coil having a predetermined number of turns establishing dropout at a current level which is a predetermined, relatively small amount less than said steady state level and establishing pull-in at a current level which is a relatively large amount greater than said steady state level but less than the maximum current level attained during said momentary startup surge, and a circuit including a warning light and said switch contact means, deenergization of said warning lamp indicating burnout of said lamp means.

2. A failsafe apparatus for monitoring a vehicle lighting circuit including a plurality of lamps connected in parallel, each lamp including a filament having a relatively low hot resistance, the current in said circuit during operation thereof having a startup surge characteristic and a substantially lesser, steady state level with all lamps functioning, said apparatus including sensitive reed relay switch means including contact means and an energizing coil with a predetermined number of turns providing a dropout current level falling between said steady state level and a lower current level drawn as a result of failure of any one of said filaments, said coil adapted to be connected in said lighting circuit in series with the parallel combination of said lamps, and indicator circuit means including an indicator light in series with said contact means, failure of said any one of said lamps causing the current in said lighting circuit to decrease blow said dropout value.

3. A system for monitoring the condition of the load of an incandescent lighting circuit of a vehicle, said load having a relatively low hot resistance, the current in said lighting circuit surging momentarily to a high level during startup and having a substantially lower, steady state level during normal operation, said system including sensitive reed relay switch means including coil means and magnetizable contact means, said coil means having a number of turns based upon a dropout current level which is a predetermined fraction of said steady state current level, said switch means further having a predetermined pull-in to dropout ampere-turn ratio establishing a pull-in current level higher than said steady state level but falling within said startup surge, and indicator circuit means connected to said contact means.

4. A monitoring system, as defined in claim 3, in which said dropout current level is approximately 75 percent of said steady state level.

5. A monitoring system, as defined in claim 4, in which said pull-in to dropout ampere-turn ratio is approximately 60:20.

6. In an automobile lighting circuit including a high beam headlight circuit, a low beam headlight circuit and a taillight circuit, each said circuit having a plurality of parallel-connected lamp filaments having a normal, steady state current level, each said filament having a relatively low hot resistance, said high beam and low beam headlight circuits being operable on a mutually exclusive basis, a monitoring system including first reed relay switch means for monitoring said high beam circuit and including magnetizable contact means adapted to be actuated by coil means connected in said high beam circuit in series with the parallel combination of said high beam circuit filaments, second reed relay switch means for monitoring said low beam headlight circuit and including magnetizable contact means adapted to be actuated by coil means connected in said low beam circuit in series with the parallel combination of said low beam circuit filaments, and third reed relay switch means for monitoring said taillight circuit and including magnetizable contact means adapted to be actuated by coil means connected in said taillight circuit in series with the parallel combination of said taillight circuit filaments, said contact means of said first and second reed relay switch means being connected in parallel, the parallel combination of said contact means of said first and second switch means being connected in series with an indicator circuit including first warning lamp means, each of said coil means of said first and second reed relay switch means having a predetermined number of turns providing each of said first and second reed relay switch means with a dropout current level falling between the steady state current level of the headlight circuit being monitored and a lower current level established upon failure of at least one of said filaments of said circuit, said first warning lamp means being energized so long as all of the filaments in said high beam and low beam headlight circuits are operating normally and deenergized when at least one of said headlight filaments burns out, said contact means of said third reed relay switch means being connected to an indicator circuit including second warning lamp means, said coil means of said third reed switch means having a predetermined number of turns providing said third reed relay switch means with a dropout current level falling between the steady state current level of said taillight circuit and a lower current level established upon failure of at least one of said filaments of said taillight circuit, said second warning lamp means being energized so long as all of the filaments in said taillight circuit are operating normally and deenergized when at least one of said taillight filaments burn out.

7. Apparatus, as defined in claim 1, in which:
said lamp means includes a plurality of filaments connected in parallel, said energizing coil being adapted for connection in series with the parallel combination of said filaments, said predetermined number of turns of said coil providing a dropout current level falling between said steady state current level and a lower current level drawn as a result of failure of at least one of said filaments.

8. Apparatus, as defined in claim 2, in which:
said predetermined number of turns of said energizing coil further establishes a pull-in current level above said steady state level but falling within the current range of said startup surge.

* * * * *

PO-1050
(5/69)

UNITED STATES PATENT OFFICE
CERTIFICATE OF CORRECTION

Patent No. 3,644,886      Dated February 22, 1972

Inventor(s) Samuel Sabaroff

It is certified that error appears in the above-identified patent and that said Letters Patent are hereby corrected as shown below:

Column 5, line 24, "heat" should read --hot--; line 57, "blow" should read --below--.

Signed and sealed this 29th day of August 1972.

(SEAL)
Attest:

EDWARD M. FLETCHER, JR.
Attesting Officer

ROBERT GOTTSCHALK
Commissioner of Patents